United States Patent [19]
Landi et al.

[11] 3,956,247
[45] May 11, 1976

[54] HALOGENATION OF EPDM IN SOLUTION IN THE PRESENCE OF EPOXIDE AND, OPTIONALLY, POLY(ALKYLENE ETHER) GLYCOL

[75] Inventors: Vincent Russell Landi, Cheshire; Eliot K. Easterbrook, Naugatuck, both of Conn.

[73] Assignee: Uniroyal Inc., New York, N.Y.

[22] Filed: Jan. 15, 1975

[21] Appl. No.: 541,173

[52] U.S. Cl. .............................. 526/42; 260/96 HA; 526/19; 526/55; 526/339
[51] Int. Cl.$^2$ ....................................... C08F 210/00
[58] Field of Search ..................... 260/80.78, 96 HA

[56] References Cited
UNITED STATES PATENTS
3,524,826  8/1970  Kresge et al. ........................... 260/5
3,753,960  8/1973  Easterbrook et al. ........... 260/80.78

FOREIGN PATENTS OR APPLICATIONS
917,100  1/1963  United Kingdom

Primary Examiner—Joseph L. Schofer
Assistant Examiner—A. L. Clingman
Attorney, Agent, or Firm—James J. Long

[57] ABSTRACT

Solution halogenation of EPDM (rubbery terpolymer of ethylene, an alpha mono-olefin, and a nonconjugated diene) in the presence of an epoxy compound such as epoxidized soybean oil with or without a poly(alkylene ether) glycol yields a halogenated EPDM of excellent viscosity stability and limited gel content.

32 Claims, No Drawings

HALOGENATION OF EPDM IN SOLUTION IN THE PRESENCE OF EPOXIDE AND, OPTIONALLY, POLY(ALKYLENE ETHER) GLYCOL

This invention relates to a method of halogenating EPDM and to improved halogenated EPDM obtained by such method.

It is known that halogenated EPDM's have superior compatibility with highly unsaturated rubbers (U.S. Pat. No. 3,524,826, Kresge et al., Aug. 18, 1970; Canadian Pat. No. 857,383, Morrissey, Dec. 1, 1970). Unfortunately, known EPDM halogenation processes frequently cause an undesirable increase in gel content which detracts seriously from the processability of the material. In addition, the conventional halogenated EPDM's frequently are found to have poor stability, as evidenced by undesirable increases in viscosity during storage or when exposed to elevated temperatures associated with finishing or processing treatments. It is an object of the invention to overcome these disadvantages.

It is known that materials containing epoxy groups, such as epoxidized soybean oil, are useful in improving the thermal stability of polyvinyl chloride resin (cf. "The Stabilization of Polyvinyl Chloride", Chevassus & DeBroutelles, St. Martins Press, N.Y., 1963, p.130). U.S. Pat. No. 3,147,315, Ennis et al., Sept. 1, 1964, teaches stabilization of chlorosulfonated polyethylene against heat degradation by the addition of epoxy compounds to its cement and prior to recovery of the polymer after halogenation. However this method improves polymer heat stability only insufficiently as far as EPDM's are concerned.

Stabilization of EPDM with mixtures including epoxy compounds is disclosed in U.S. Pat. Nos. 3,361,691, Mazzeo, Jan. 2, 1968, 3,658,743, Bevilacqua, Apr. 25, 1972, and 3,661,822, Lee, May 9, 1972.

U.S. Pat. No. 3,547,855, Loveless, Dec. 15, 1970, discloses removal of catalyst residues from EPDM with a mixture of alkanolamine and a polyether glycol.

U.S. Pat. No. 3,753,960, Easterbrook, Aug. 21, 1973, discloses prevention of gel build-up and viscosity increases in EPDM by adding a Lewis base (e.g., polypropylene glycol) to the polymerization reaction mixture at the conclusion of the polymerization.

In accordance with the present invention, halogenated EPDM is prepared by addition of halogen to EPDM cements in the presence of an acid acceptor having oxirane linkages such as epoxidized soybean oil (I) alone or in admixture with a poly ether glycol such as polypropylene glycol (II). Unexpectedly, when halogenation is carried out at elevated temperatures the tendency towards unwanted gelation of the rubber is substantially suppressed when using the process according to the invention. Also unexpectedly the viscosity stability of halogenated EPDM products prepared at low or high temperatures is substantially superior to halogenated EPDM prepared according to prior art methods.

It has been found that by adding I or I and II to an EPDM solution before the halogenation step an halogenated EPDM may be produced having both low gel content and greatly reduced tendency towards increase in viscosity upon storage and processing. The products prepared according to this invention are useful in blends with highly unsaturated rubbers to impart to the blend the ozone, oxidation and weathering resistance inherent in the EPDM. Such blends are greatly improved over the analogous blends with unhalogenated EPDM in that the former have greatly improved tensile strength, modulus, lower heat build up under dynamic conditions, and superior adhesion to diene rubber stocks and various other substrates. The halogenated EPDM blends with diene rubbers, because of these properties, are attractive in such applications as tire sidewalls, including radial tire sidewalls.

Halogenation of non-polar rubber is also known as a method to improve oil resistance over that of the non-halogenated rubber, and to improve physical compatibility with polar rubbers.

The EPDM employed in the invention may be defined as an elastomeric, unsaturated, vulcanizable terpolymer of ethylene, at least one alpha-monoolefin having 3 to 8 carbon atoms such as propylene, 1-butene, etc. (preferably propylene), and a straight or branched chain acyclic, or an alicyclic non-conjugated diene. The elastomeric terpolymers which are particularly suitable contain 20–80% ethylene and 80–20% propylene and between 2% to 20% non-conjugated diolefin, all by weight. Representative non-limiting examples of non-conjugated diolefins that may be used as the third monomer include: 5-ethylidene-2-norbornene, 1,4-hexadiene and dicyclopentadiene; additional suitable dienes are disclosed in the references mentioned above.

The halogenating agent used may be bromine, chlorine, iodine or their interhalogen compounds (e.g. BrCl), or mixtures thereof, and is preferably bromine or BrCl. Usually, the halogenated terpolymer of this invention has a halogen content from 0.1% to 20%, preferably 0.25% to 10% by weight.

The epoxides employed in the invention are soluble in hydrocarbon solvents (e.g. hexane), preferably substantially insoluble in water, and preferably do not boil at temperatures normally encountered in processing EPDM. They include epoxidized soybean oil, epoxidized higher fatty acid esters, epoxides of diolefin polymers, bisphenol A-epichlorohydrin reaction product, and epoxides of monomeric olefinically unsaturated hydrocarbons, whether open chain, alicyclic, or aromatic. The epoxidized higher fatty acid esters are typified by esters of $C_{10}$ to $C_{30}$ fatty acids with alkanols having up to 10 carbon atoms (e.g. methyl alcohol, octyl alcohol, decyl alcohol and the like). Examples of commercial types of epoxidized soybean oil are Paraplex (trademark) G-60, G-61, G-62 and Flexol EPO (trademark) which have an average molecular weight of 1000 (see for example U.S. Pat. No. 2,829,135). Epoxidized higher fatty acid esters are represented by such commercial materials as Drapex 3.2 (trademark), octyl epoxy stearate having a molecular weight of 410 or Monoplex S-71 (trademark), an epoxidized oleate ester with an average molecular weight of 380. Other epoxides which may be employed are epoxides of diolefin polymers such as the commercial material Oxiron (trademark) which is an epoxidized polybutadiene (see U.S. Pat. No. 2,829,135). Reaction products of bisphenol A and epichlorohydrin (diglycidyl ether types) such as the commercial products Epon (trademark) 820, 826 or 830 may also be used. Epoxides of simple olefins, diolefins, etc. may also be employed including those of low molecular weight where retention of the epoxide in the finished product is not desired. Examples of this class are: ethylene oxide, propylene oxide, epichlorohydrin, 1-butylene oxide, 2-butylene oxide, pentylene oxide, butadiene monoxide, cyclohexene oxide, cyclopentene oxide, vinyl cyclohexene mono and dioxide, styrene oxide, norbornadiene mono and dioxide, dicyclopentadiene mono and dioxide, 1,2,5,6-diepoxycyclooctane, 1,2,7,8-diepoxyoctane, stilbene oxide, etc. Suitable epoxy compounds are further described in U.S. Pat. Nos. 3,361,691 (col. 2, lines 4–22) and 3,658,743 (col. 9, lines 1–35) referred to above.

The number of moles of oxirane oxygen (i.e. moles of epoxide groups) should be 0.05 to 2 times the number of gram atoms of halogen used to halogenate the polymer. Usually there should be 0.1 to 1 mole of oxirane oxygen for each gram atom of halogen used to halogenate the polymer. The amount of oxirane oxygen on a common epoxidized soybean oil Paraplex G-62 (trademark) is about 6.8 wt.%. The preferred range for Paraplex G-62 is therefore 23.5 grams to 235 grams of Paraplex G-62 per gram atom of halogen.

Non-limiting examples of polyethers which may be used in combination with the above epoxy compounds include the polyalkylene ether glycols such as polypropylene glycols and polyethylene glycols from 200 to 10,000 molecular weight, at levels of addition of 0 to not more than 5 parts based on 100 parts of the EPDM by weight (preferably 0.25 to 2.5 parts).

According to the present invention the above described EPDM polymers are halogenated in solution with sufficient halogen to yield a polymer preferably containing 0.25% to 10 wt.% halogen, most preferably 0.5% to 5 wt.% halogen. Preferably, to a 3 to 15 weight percent solution containing 100 parts of terpolymer in a suitable inert organic solvent such as hexane there is added epoxy compound sufficient to give 0.01 to 4.5 parts oxirane oxygen, and 0 to 5.0 parts of the polyether. To this is added 1 to 10 parts of halogen, preferably dissolved in a suitable solvent such as hexane or carbon tetrachloride. Preferably the reaction is carried out in the absence or near absence of light, in opaque vessels in a darkened area. Temperature can range from −30° to 100°C., preferably between 20°C. and 80°C. When bromine or bromine chloride is used, the halogenation temperature employed is ordinarily from −30° to 100°C., preferably 20° to 80°C. When chlorine is the halogenating agent, the temperature employed is ordinarily 50° to 100°C., preferably 60° to 80°C. After carrying out the reaction of the halogen with the polymer, preferably for 15 minutes to 2 hours, the cement is washed repeatedly (usually twice) with water. To the washed cement is added from 0.25 to 5 parts calcium stearate and from 0.01 to 2 parts of an antioxidant such as a mixture of 2 parts nonylated phenyl phosphite and 1 part styrenated p-cresol (AO 449 [trademark]). Additional polyether may also be added.

The following examples, in which all quantities are expressed by weight unless otherwise indicated, will serve to illustrate the practice of the invention in more detail.

EXAMPLE 1

Two hundred grams of ethylene-propylene-ethylidene norbornene terpolymer containing approximately 43 wt.% propylene and 9 wt.% ethylidene norbornene, Mooney viscosity 52 ML-4 at 250°F., is dissolved in 6500 ml of n-hexane. To this cement is added 5 grams of Paraplex G-62, epoxidized soybean oil having an oxirane number of about 6.8. This mode of the epoxy compound (Paraplex G-62) addition is termed BEFORE in TABLES I through IV. The cement is put into a 12 liter flask kept free of ambient light by enclosure with black polyethylene film. To this cement is added, with agitation, 3.6 grams of bromine in about 150 ml of hexane. Precautions are taken to prevent light from entering the reactor. The reaction essentially proceeds at room temperature. After 1 hour the reaction mixture is removed and washed twice in a 1:1 ratio with roughly 40°C. water in a Waring Blendor (trademark). At this point 2 grams of antioxidant (e.g., mixture of 2 parts nonylated phenyl phosphite and 1 part styrenated p-cresol, A.O. 449 [trademark]) and 2 grams calcium stearate are added. The polymer is recovered by steam flocculation, a process by which hexane is driven off with steam. The wet polymer is ground, allowed to drain at room temperature, and is then dried in a vacuum oven for about 16 hours at 60°C. Bound bromine determined on the sample so recovered is 1.62 wt.%. However, some of the sample is redissolved in hexane and flocculated by addition to isopropanol, a process which removes the epoxy compound and other low molecular weight material from the polymer sample. The bound bromine after removing Paraplex in this fashion is 0.86 wt.%. In the tables bromine analyses of steam flocculated polymer is in rows entitled BOUND BROMINE, while bromine analyses on redissolved steam flocculated polymer which is then flocculated in isopropanol is in rows entitled BROMINE AFTER PARAPLEX REMOVAL.

Viscosity of the dried polymer is measured using the Mooney viscosity test, ML-4 at 250°F. Mooney viscosity samples are prepared in a standard way by milling the polymer and stamping out discs for the Mooney test. Some discs are aged at 100°C in an air circulating oven for 8 hours and 24 hours. Mooney viscosities of unaged and aged samples are shown in TABLE I. There is essentially no change in ML-4 in the aged samples.

Samples are blended with natural rubber in the following standard recipe used throughout these examples:

| | |
|---|---|
| Halogenated EPDM | 50 |
| Natural Rubber - SMR No. 5 | 50 |
| Silene D (trademark; hydrated silica) | 50 |
| FEF Black | 25 |
| Circosol 4240 (trademark; petroleum hydrocarbon process oil, specific gravity 0.95) | 30 |
| Zinc Oxide | 3.5 |
| Stearic Acid | 2.0 |
| DELAC NS (trademark; N-t-butyl-2-benzothiazole sulfenamide) | 1.0 |
| DPG (diphenyl guanidine) | 0.3 |
| Sulfur | 2.0 |

The cure compatibility with highly unsaturated rubbers is known to improve markedly when EPDM is halogenated. This is seen in increases in modulus and tensile strength of the EPDM blends. Comparison is given in TABLE I with an unhalogenated control of the same EPDM rubber type as was halogenated. It is seen that there is a substantial improvement in modulus at 300% elongation.

EXAMPLE 2

This example is outside the invention and is included for purposes of comparison.

The procedure of Example 1 is essentially followed except that Paraplex G-62 is not added before bromine addition. Instead the Paraplex G-62 in the same amount as in Example 1 is added after washing of the cement. This mode of addition is termed AFTER in TABLES I–IV.

Examination of Mooney viscosity data for Example 2 shows a serious increase in viscosity due to aging of the polymer. Bromination in the presence of Paraplex (Example 1), however, improves the ML stability of the polymer.

The uptake of bromine in this sample is apparently lower than in Example 1. However, when Paraplex is removed the bound bromine is similar in both Examples 1 and 2. It is possible that the bromine uptake difference is explained by production of HBr during bromination which subsequently reacts with Paraplex G-62.

EXAMPLES 3–5

The procedure of Example 1 is essentially followed except that:
1. 4.8 grams of bromine is added.
2. the levels of Paraplex G-62 are varied.

Results are summarized in TABLE II.

EXAMPLE 6

The procedure of Examples 3–5 is essentially followed except in place of the Paraplex G-62 being added alone before halogenation a mixture of 2.5 grams Paraplex G-62 and 2.5 grams polypropylene glycol of about 2000 MW (PPG-2000; trademark) is added before halogenation. Results are summarized in TABLE II.

EXAMPLE 7

This comparison example is outside the invention.

The procedure of Example 2 is essentially followed except that 4.8 grams bromine is added. Paraplex is added after halogenation and washing. This example and the four previous examples, all summarized in TABLE II, demonstrate again the importance of adding Paraplex G-62 before halogenation. In each case there is a substantial improvement in viscosity stability, even with as little as 1.25 phr Paraplex G-62. There is an additional improvement when a mixture of Paraplex G-62 and PPG-2000 is used. Raising the level of Paraplex G-62 to 5 phr is accompanied by a decrease in cured modulus in the blend with natural rubber, although viscosity stability is excellent.

EXAMPLE 8

In Examples 1–7 one part per hundred rubber of calcium stearate is added after washing the cement. In this example the calcium stearate is left out. Results in TABLE II indicate that calcium stearate renders an improvement in viscosity stability.

EXAMPLE 9

One thousand grams of the same rubber type as used in Example 1 is dissolved in 14,000 ml. of hexane. To 2800 ml. of the above cement (ca. 185 grams rubber) is added 10 grams of Paraplex G-62. This cement is heated to 50°C and 3 grams of bromine in 150 cc of hexane is added. As before, light is blocked from the reaction. The reaction is run for 3 hours during which time temperature is maintained around 50°C. Solutions are washed twice with warm water and 2 grams of A.O. 449 and 5 grams of calcium stearate are added to the washed cement before drying as in Example 1. Viscosity stability and cocure modulus data are given in TABLE III.

EXAMPLE 10

This example is outside the scope of the invention and is included for purposes of comparison.

The procedure of Example 9 is essentially followed except that the 5 parts of Paraplex G-62 is added after washing rather than before bromine addition. As can be seen in TABLE III there is a high level of gel formed. In Mooney viscosity measurements the so-called "fracture" condition is observed, indicated in TABLE III by F following the Mooney torque value. This is a sign of crumbling under an applied shear and indicates a very poor processing rubber. When there is fracture the Mooney torque measured is not considered meaningful in comparison to Mooney torque values obtained without fracture. Co-cure modulus is very high as in Example 10 when gel levels are high. In Example 9, however, which is a good processing polymer there is a substantial improvement in co-cure modulus over the unbrominated control (TABLE III) which also contains 5 parts of Paraplex G-62. The addition of Paraplex G-62 before halogenation therefore suppresses gel formation at 50°C. while still allowing preparation of a halogenated EPDM of superior co-curability with highly unsaturated rubber.

EXAMPLE 11

The procedure of Example 9 is essentially followed except that before bromine addition a mixture of 5 grams of Paraplex G-62 and 5 grams of PPG-2000 is used instead of 10 grams of Paraplex G-62. As shown in TABLE III the viscosity stability of the product is excellent, and good co-cure properties are obtained.

It is interesting that in Examples 9–11 a high bromine incorporation is found regardless of the presence of Paraplex before halogen addition. However, removal of Paraplex shows that in those samples where Paraplex is present during halogenation the final uptake of Br on the polymer is 40–50% of that added. This suggests that HBr reacts further with polymer at 50°C. unless it is removed by the Paraplex.

EXAMPLE 12

This comparison example is outside the invention.

Five hundred grams of the rubber employed in Example 1 is treated at 40°C with 7.5 grams of bromine for 3.5 hours with other conditions similar to Example 10. After washing 5 phr of PPG-2000 is added. Mooney viscosity stability (TABLE III) is very poor. The use of PPG-2000 alone without epoxy compound was not sufficient to produce a halogenated EPDM with good viscosity stability, in addition to good co-cure properties.

EXAMPLE 13

One hundred and fifty grams of a similar EPDM to that used in Example 1 is dissolved in hexane to make a solution containing 8% solids. To this cement is added a mixture of 3.75 grams of Paraplex G-62 and 3.75 grams of PPG-2000. Thereafter essentially the same halogenation and finishing procedure is followed as in Example 1 except that in this case the halogenating agent is bromine chloride at the level of 3.6 grams. The product has excellent viscosity stability and good co-cure properties with natural rubber (TABLE IV).

EXAMPLE 14

The procedure of Example 13 is essentially followed except that 1.88 grams of Paraplex G-62 and 1.88 grams of PPG-2000 are added.

EXAMPLE 15

This comparison example is outside the invention.

The procedure of Example 13 is essentially followed except that the Paraplex G-62 is added after washing at the level of 3.75 grams. Viscosity stability is substantially inferior to that found in the preceding two examples (TABLE IV).

Examples 13–15 show that the method revealed here for stabilizing brominated EPDM works also for bromine chlorinated EPDM.

EXAMPLE 16

This example is outside the invention.

A rubber similar to that used in Example 13 is treated at room temperature for 2 hours in essentially the same way up to the washing step as in Example 15 except that 3 phr BrCl is added. After halogenation but before washing 2 phr pyridine is added to portion A of this cement. No pyridine is added to portion B. Both cements are washed twice at about 32°C with water. To the washed cement is added 1 phr A.O. 449, 1.5 phr calcium stearate and 2.5 phr Paraplex G-62. Viscosity stability results are shown in TABLE V. Viscosity stability is poor and not significantly different in either sample. Apparently, addition of a base capable of removing HBr and HCl from the solution after halogenation is not sufficient to stabilize the polymer.

EXAMPLE 17

One hundred and fifty grams of a similar EPDM to that used in Example 1 is dissolved in hexane to make a solution containing 8% solids. To this cement is added a mixture of 3.75 grams of Paraplex G-62 and 3.75 grams of PPG-2000. The solution is heated to the refluxing temperature of hexane, about 68°C. Then 3.6 grams of chlorine is added in about 150 cc. of hexane and allowed to react 1 hour before finishing the polymer as in Example 1. The polymer so made contains 18% gel and has an unaged ML-4 at 250°F. of 66.

EXAMPLE 18

This comparison example is outside the invention.

The procedure of Example 17 is essentially followed except that no PPG-2000 is added, and 3.75 grams of Paraplex G-62 is added "after" rather than "before". The polymer so prepared has 28% gel and an unaged ML-4 at 250°F. of 89. Examples 17 and 18 show that by using the present invention one can suppress the formation of gel during chlorination of EPDM at elevated temperature.

EXAMPLE 19

The procedure of Example 9 is essentially followed except for the hereafter described differences. The 150 gms. of rubber is mixed with cyclohexane instead of hexane to prepare about 2600 ml. of solution. Instead of 50°C., a reaction temperature of 80°C. is used. Instead of 1.62 phr bromine charged there is used 1.5 phr of bromine. The amount of Paraplex G-62 added before is 2.5 phr rather than 5.4 phr. To the washed cement is added 1.0 phr A.O. 449 and 2.5 phr calcium stearate. Viscosity stability and % gel data are given in TABLE VI.

EXAMPLE 20

The procedure of Example 19 is essentially followed except that the 2.5 phr Paraplex G-62 is added after washing rather than before the addition of bromine. It can be seen from TABLE VI that addition of Paraplex G-62 before halogenation has a similar effect on suppressing gel formation and improving viscosity stability when the reaction is carried out at 80°C.

EXAMPLE 21

The procedure of Example 9 is essentially followed except that 1.5 phr bromine, 1.0 phr A.O. 449 and 2.5 phr calcium stearate are used. Instead of adding Paraplex G-62 before adding bromine, however, 2.5 phr vinyl cyclohexane dioxide is added. After washing 1.25 phr Paraplex G-62 is added along with the A.O. 449 and calcium stearate. Gel and viscosity stability data are shown in TABLE VI.

EXAMPLE 22

The procedure of Example 21 is followed except 2.5 phr methyl 10,11-epoxyundecanoate was added instead of 4-vinylcyclohexenedioxide.

EXAMPLE 23

This comparison run is outside the invention.

The procedure of Example 21 is followed except: no vinylcyclohexene dioxide is added before the bromine; and after washing 2.5 phr Paraplex G-62 is added instead of 1.25 phr Paraplex.

Examples 21–23 were run in the same experimental series. Examples 24 and 25 to follow were conducted in a different experimental series.

EXAMPLE 24

The procedure of Example 21 is essentially followed except instead of vinyl cyclohexene dioxide, there is added 2.5 phr propylene oxide.

EXAMPLE 25

The procedure of Example 23 is followed, to provide a comparison run outside the invention.

Examples 21–25 (TABLE VI) demonstrate the gel suppressant and viscosity stabilizing effects in halogenated EPDM of lower molecular weight epoxide compounds.

TABLE I

|  | Example No. | | |
|---|---|---|---|
|  | 1 | 2 | Unbrominated control |
| Bromination Temperature | R.T. | R.T. |  |
| Added Bromine (phr) | 1.8 | 1.8 |  |
| Bound Bromine (%) | 1.62 | 0.87 |  |
| Bromine After Paraplex Removal (%) | 0.86 | 0.71 |  |

TABLE I-continued

|  | Example No. | | |
|---|---|---|---|
|  | 1 | 2 | Unbrominated control |
| Mode Paraplex Addition | Before | After |  |
| Paraplex Level (phr) | 2.5 | 2.5 |  |
| ML-4 at 250°F. |  |  |  |
| Unaged | 62 | 58 |  |
| Aged 8 hrs. at 100°C. | 59 | 67 |  |
| Aged 24 hrs. at 100°C. | 63 | 81 |  |
| Co-cure Properties |  |  |  |
| Modulus at 300% Elong. (psi) | 1040 | 940 | 650 |
| Tensile Strength (psi) | 1520 | 1440 | 1230 |

TABLE II

|  | Example No. | | | | | |
|---|---|---|---|---|---|---|
|  | 3 | 4 | 5 | 6 | 7 | 8 |
| Bromination Temp. | R.T. | R.T. | R.T. | R.T. | R.T. | R.T. |
| Added Bromine (phr) | 2.4 | 2.4 | 2.4 | 2.4 | 2.4 | 2.4 |
| Bound Bromine (%) | 1.57 | 1.85 | 2.09 | 1.86 | 1.25 | 1.96 |
| Bromine After Paraplex Removal (%) | 1.05 | — | 1.18 | — | 1.11 | — |
| Mode Paraplex G-62 Addn. | Before | Before | Before | Before | After | Before |
| Paraplex Level | 1.25 | 2.5 | 5.0 | 1.25 | 2.5 | 2.5 |
| PPG-2000 Added Before (phr) |  |  |  | 1.25 |  |  |
| Calcium Stearate Added After (phr) | 1.0 | 1.0 | 1.0 | 1.0 | 1.0 | 0 |
| ML-4 at 250°F. |  |  |  |  |  |  |
| Unaged | 62 | 59 | 60 | 64 | 59 | 60 |
| Aged 8 hrs. at 100°C. | 62 | 61 | 61 | 60 | 68 | 65 |
| Aged 24 hrs. at 100°C. | 66 | 64 | 57 | 62 | 84 | 72 |
| Co-cure Properties |  |  |  |  |  |  |
| Modulus at 300% El. (psi) | 950 | 800 | 690 | 970 | 950 | 920 |
| Tensile Strength (psi) | 1490 | 1520 | 1450 | 1570 | 1530 | 1460 |

TABLE III

|  | Example No. | | | | |
|---|---|---|---|---|---|
|  | 9 | 10 | 11 | 12 | Unbrominated Control |
| Bromination Temperature | 50°C. | 50°C. | 50°C. | 50°C. |  |
| Bromine Added (phr) | 1.62 | 1.62 | 1.62 | 1.5 |  |
| Bound Bromine By Analysis (%) | 1.76 | 1.58 | 1.46 | 1.10 |  |
| Bromine After Paraplex Removal (%) | 0.78 | 1.13 | 0.72 | — |  |
| Mode of Paraplex Addition | Before | After | Before |  |  |
| Paraplex G-62 Level (phr) | 5.4 | 5.4 | 2.7 | — | 5 |
| PPG-2000 Added Before (phr) | — | — | 2.7 | 5 | — |
| % Gel | 4 | 45 | 8 | 17 | 7 |
| ML-4 at 250°F. |  |  |  |  |  |
| Unaged | 48 | 77F | 48 | 61 | 45 |
| Aged 8 hrs. at 100°C. | 56 | 80F | 51 | 76F |  |
| Aged 24 hrs. at 100°C. | 68 | — | 55 | 85F |  |
| Co-cure |  |  |  |  |  |
| Modulus at 300% El. (psi) | 860 | 1480 | 890 | 900 | 540 |
| Tensile Strength (psi) | 1650 | 1870 | 1620 | 1630 | 990 |

TABLE IV

|  | Example No. | | | |
|---|---|---|---|---|
|  | 13 | 14 | 15 | Unbrominated Control |
| Halogenation Temperature | R.T. | R.T. | R.T. |  |
| Bromine Chloride Added (phr) | 2.4 | 2.4 | 2.4 |  |
| Bound Bromine (%) | 1.4 | 1.17 | .82 |  |
| Bound Chloride (%) | .46 | .33 | .24 |  |
| Mode of Paraplex Addition | Before | Before | After |  |
| Level of Paraplex (phr) | 2.5 | 1.25 | 2.5 |  |
| PPG-2000 Added Before (phr) | 2.5 | 1.25 | — |  |
| % Gel | 17 | 12 | 13 |  |
| ML-4 at 250°F. |  |  |  |  |
| Unaged | 57 | 56 | 50 |  |
| Aged 8 hrs. at 100°C. | 59 | 60 | 65 |  |
| Aged 24 hrs. at 100°C. | 58 | 62 | 87 |  |
| Co-cure |  |  |  |  |
| Modulus at 300% Elong. (psi) | 920 | 930 | 860 | 630 |
| Tensile Strength (psi) | 1570 | 1540 | 1500 | 1200 |

TABLE V

|  | Example 16 | |
|---|---|---|
|  | A | B |
| Pyridine | 2 | — |
| ML-4 at 250°F. | | |
| Unaged | ~59 | ~59 |
| 8 Hrs. at 100°C. | 68 | 72 |
| 24 Hrs. at 100°C. | 80 | 82 (possible verge of fracture onset) |

TABLE VI

| Example No. | 19 | 20 | 21 | 22 | 23 | 24 | 25 |
|---|---|---|---|---|---|---|---|
| Bromination Temperature | 80°C. | 80°C. | 50°C. | 50°C. | 50°C. | 50°C. | 50°C. |
| Added Bromine (phr) | 1.5 | 1.5 | 1.5 | 1.5 | 1.5 | 1.5 | 1.5 |
| Bound Bromine, % | 1.6 | 1.4 | 0.98 | 1.37 | 0.99 | 1.15 | 1.38 |
| Vinyl Cyclohexene Dioxide (Before) | — | — | 2.5 | — | — | — | — |
| Methyl 10,11 Epoxy Undecanoate (Before) | — | — | — | 2.5 | — | — | — |
| Propylene Oxide (Before) | — | — | — | — | — | 2.5 | — |
| Paraplex G-62 (Before) | 2.5 | — | — | — | — | — | — |
| Paraplex (After) | — | 2.5 | 1.25 | 1.25 | 2.5 | 1.25 | 2.5 |
| % Gel | 13 | 35 | 9 | 10 | 22 | 13 | 39 |
| ML-4 at 250°F. | | | | | | | |
| Unaged | 63 | 78 | 50 | 47 | 74 | 37 | 75 |
| Aged 8 hrs. at 100°C. | 59 | 99 | — | — | — | 44 | 111F |
| Aged 24 hrs. at 100°C. | 82 | 113F | 80 | 80 | 120F | 66 | — |
| Co-cure Properties | | | | | | | |
| Modulus at 300% Elongation (psi) | 840 | — | — | 580 | 620 | 820 | 860 |
| Tensile Strength (psi) | 1730 | — | — | 1480 | 1570 | 1670 | 1780 |

We claim:

1. A method of halogenating an elastomeric, unsaturated, vulcanizable terpolymer of ethylene, an alpha-monoolefin having 3 to 8 carbon atoms and a copolymerizable non-conjugated diene, comprising providing a solution of said terpolymer in an inert organic solvent, adding to said solution a halogen selected from the group consisting of chlorine, bromine, iodine and their interhalogen compounds, and an epoxide, subjecting the solution to a temperature within the range of from −30 to 100°C, whereby the said terpolymer becomes halogenated in the presence of said epoxide, and thereafter recovering from the solution a halogenated terpolymer characterized by viscosity stability and low gel content.

2. A method as in claim 1 in which a poly(alkylene ether) glycol is present in the solution during the halogenation.

3. A method as in claim 2 in which the poly(alkylene ether) glycol is polypropylene glycol.

4. A method as in claim 1 in which the terpolymer is an ethylene-propylene-non-conjugated diene terpolymer.

5. A method as in claim 4 in which the non-conjugated diene is 5-ethylidene-2-norbornene.

6. A method as in claim 1 in which the halogen is bromine, chlorine, or bromine chloride.

7. A method as in claim 6 in which the halogen is bromine.

8. A method as in claim 6 in which the halogen is bromine chloride.

9. A method as in claim 6 in which the halogen is chlorine.

10. A method as in claim 1 in which the epoxide is epoxidized soybean oil, vinylcyclohexene dioxide, methyl 10,11-epoxyundecanoate, or propylene oxide.

11. A method as in claim 10 in which the epoxide is epoxidized soybean oil.

12. A method as in claim 10 in which the epoxide is vinylcyclohexene dioxide.

13. A method as in claim 10 in which the epoxide is methyl 10,11-epoxyundecanoate.

14. A method as in claim 10 in which the epoxide is propylene oxide.

15. A method as in claim 1 in which calcium stearate is added to the solution subsequent to the halogenation and prior to the recovery of the terpolymer.

16. A method of halogenating an elastomeric, unsaturated, vulcanizable terpolymer of ethylene, an alpha-monoolefin having 3 to 8 carbon atoms and a copolymerizable non-conjugated diene, comprising providing a solution in an inert organic solvent containing from 3 to 15% by weight of said terpolymer, adding to said solution from 1 to 10 parts by weight of halogen per 100 parts by weight of said terpolymer, said halogen being selected from the group consisting of chlorine, bromine, iodine and their interhalogen compounds, and an epoxide selected from the group consisting of epoxidized soybean oil, epoxidized higher fatty acid ester, epoxide of a diolefin polymer, bisphenol A-epichlorohydrin reaction product, and epoxide of a monomeric olefinically unsaturated hydrocarbon in amount sufficient to provide from 0.05 to 2 moles of epoxide group per gram atom of halogen present, subjecting the resulting solution to a temperature of from 20° to 80°C. in the absence or near absence of light, whereby the said terpolymer becomes halogenated in the presence of said epoxide, and thereafter recovering from the solution a halogenated terpolymer containing from 0.25% to 10% halogen by weight, characterized by viscosity stability and low gel content.

17. A method as in claim 16 in which there is further added to the said solution, prior to the halogenation, up to 5% by weight, based on the weight of the terpolymer, of a poly(alkylene ether) glycol having a molecular weight of from 200 to 10,000.

18. A method as in claim 17 in which the amount of poly(alkylene ether) glycol employed is from 0.25 to 2.5 parts, per 100 parts by weight of the terpolymer.

19. A method as in claim 18 in which the said poly(alkylene ether) glycol is polypropylene glycol.

20. A method as in claim 16 in which the terpolymer is an ethylene-propylene-non-conjugated diene terpolymer.

21. A method as in claim 20 in which the non-conjugated diene is 5-ethylidene-2-norbornene.

22. A method as in claim 16 in which the halogen is bromine, chlorine, or bromine chloride.

23. A method as in claim 22 in which the halogen is bromine.

24. A method as in claim 22 in which the halogen is bromine chloride.

25. A method as in claim 22 in which the halogen is chlorine.

26. A method as in claim 16 in which the epoxide is epoxidized soybean oil, vinylcyclohexene dioxide, methyl 10,11-epoxyundecanoate, or propylene oxide.

27. A method as in claim 26 in which the epoxide is epoxidized soybean oil.

28. A method as in claim 26 in which the epoxide is vinylcyclohexene dioxide.

29. A method as in claim 26 in which the epoxide is methyl 10,11-epoxyundecanoate.

30. A method as in claim 26 in which the epoxide is propylene oxide.

31. The product of the method of claim 1.

32. The product of the method of claim 16.

* * * * *